United States Patent [19]

Becker et al.

[11] Patent Number: 5,153,235

[45] Date of Patent: Oct. 6, 1992

[54] PRODUCTION OF ELASTIC, COMPACT OR CELLULAR MOLDINGS BASED ON ELASTOMERS CONTAINING N-BENZYLUREA GROUPS IN BOUND FORM, ELASTOMERS OF THIS TYPE, AND N-BENZYLPOLYOXYALKYLENE-POLYAMINES WHICH ARE SUITABLE FOR THIS PURPOSE

[75] Inventors: Johannes Becker, Ludwigshafen; Guenther Matzke, Heidelberg; Hans U. Schmidt, Griesheim; Willibald Schoenleben, Heidelberg, all of Fed. Rep. of Germany

[73] Assignee: BASF Aktiengesellschaft, Ludwigshafen, Fed. Rep. of Germany

[21] Appl. No.: 824,976

[22] Filed: Jan. 24, 1992

Related U.S. Application Data

[62] Division of Ser. No. 628,298, Dec. 17, 1990.

[30] Foreign Application Priority Data

Jan. 2, 1990 [DE] Fed. Rep. of Germany ....... 4000013

[51] Int. Cl.$^5$ .............................................. C08G 18/50
[52] U.S. Cl. .................................... 521/159; 564/384; 564/385; 564/389; 564/391; 252/182.23; 528/68
[58] Field of Search ............... 564/384, 385, 389, 391; 252/182.23; 528/68; 521/159

[56] References Cited

U.S. PATENT DOCUMENTS 4,904,751 2/1990 Speranza et al. ..................... 528/45

*Primary Examiner*—Maurice J. Welsh
*Assistant Examiner*—Rachel Johnson
*Attorney, Agent, or Firm*—William G. Conger

[57] ABSTRACT

The present invention relates to a process for the production of elastic, compact or cellular moldings based on elastomers containing N-benzylurea groups in bound form, by reacting
  a) one or more organic and/or modified organic polyisocyanates with
  b) N-benzylpolyoxyalkylene-polyamines or mixtures of N-benzylpolyoxyalkylene-polyamines and polyoxyalkylene-polyamines containing from 2 to 4 primary amino groups and
  c) one or more alkyl-substituted aromatic polyamines having a molecular weight of up to 500, in the presence or absence of
  d) catalysts and, if desired,
  e) blowing agents,
  f) auxiliaries and/or
  g) additives, and to the N-benzylpolyoxyalkylene-polyamines and mixtures of N-benzylpolyoxyalkylene-polyamines and polyoxyalkylene-polyamines containing from 2 to 4 primary amino groups which can be used for this purpose, and to the elastomers prepared.

3 Claims, No Drawings

PRODUCTION OF ELASTIC, COMPACT OR CELLULAR MOLDINGS BASED ON ELASTOMERS CONTAINING N-BENZYLUREA GROUPS IN BOUND FORM, ELASTOMERS OF THIS TYPE, AND N-BENZYLPOLYOXYALKYLENE-POLYAMINES WHICH ARE SUITABLE FOR THIS PURPOSE

This is a division of application Ser. No. 07/628,298 filed Dec. 17, 1990.

The present invention relates to a process for the production of elastic, compact or cellular moldings based on elastomers containing N-benzylurea groups in bound form by reacting organic, unmodified or modified polyisocyanates with N-benzylpolyoxyalkylene-polyamines or mixtures of N-benzylpolyoxyalkylene-polyamines and polyoxyalkylene-polyamines containing two or more primary amino groups and low-molecular-weight, alkyl-substituted aromatic polyamines, expediently with the aid of the RIM technique, and to N-benzylpolyoxyalkylene-polyamines or mixtures of these N-benzylpolyoxyalkylene-polyamines and polyoxyalkylene-polyamines containing two or more primary amino groups which can be used for this purpose, and to elastomers of this type containing N-benzylurea groups in bound form.

Numerous publications and patents disclose the preparation of elastomers containing urethane groups, urea groups or urethane and urea groups in bound form and processes for the production of elastic, compact or cellular moldings from elastomers of this type using the RIM technique (reaction injection molding).

According to DE-B-2,622,951 (U.S. Pat. No. 4,218,543) cellular or non-cellular, elastic moldings having a closed surface layer can be produced from polyurethane-polyurea elastomers by reaction injection molding. The formulations which are suitable for this purpose comprise essentially organic polyisocyanates, polyols, reactive aromatic diamines or polyamines which are substituted in the o-position to the amino group by alkyl groups, and effective catalysts for the reaction between hydroxyl and isocyanate groups. The essential feature here is that the aromatic diamines or polyamines are miscible in any ratio with polyols of molecular weight from 12000 to 1800, the alkyl substituents have from 1 to 3 carbon atoms, at least two of the alkyl substituents having 2 or 3 carbon atoms, and each of the o-positions to the amino groups is substituted. Systems of this type have initiation times of down to less than one second; the transition from the liquid phase to the solid phase takes place virtually instantaneously, which has the consequence that the liquid reaction mixture virtually solidifies on the walls of the mold.

It is furthermore known that the reactivity of aromatically bound amino groups towards isocyanates can be considerably reduced by means of electron-withdrawing substituents. Examples of aromatic diamines of this type are, according to DE-C-12 16 538 (British Patent 981,935), 3,3'-dichloro-4,4'-diaminodiphenylmethane, 3,3'-dinitro-4,4'-diaminodiphenylmethane and 3,3'-dichloro-4,4'-diaminobiphenyl, the processing of which requires complex and aggravating regulations due to misgivings with respect to an action which is detrimental to health. However, the highly electronegative substituents of these compounds reduce the reactivity of the aromatically bound amino groups so much that curing of the moldings produced by reaction injection molding requires up to 15 minutes and is thus uneconomic.

According to EP-A 026,915, polyurethane-polyurea formulations having somewhat reduced reactivity compared with systems of DE-B 26 22 951 are obtained when the aromatic diamines used are 3,3', 5,5'-tetraalkyl-substituted 4,4'-diaminodiphenylmethanes in which the alkyl radicals are identical or different methyl, ethyl, isopropyl, sec.- or tert.-butyl radicals, where at least one of the substituents must be isopropyl or sec.-butyl. The tetraalkyl-substituted diaminodiphenylmethanes described have very good miscibility at room temperature with the polyols in the necessary amounts and have only a slight tendency towards crystallization, or none at all, which means that the formulations are easy to handle under the conditions which are usual for conventional RIM systems. However, it has become apparent that the tetraalkyl-substituted 4,4'-diaminodiphenylmethanes described may be insufficiently reactive for particular applications.

EP-A 069,286 describes polyurethane-polyurea formulations which are somewhat more reactive than those in EP-A 026,915. The aromatic diamines used are trialkyl-substituted meta-phenylenediamines, where two of the alkyl substituents are identical or different linear or branched alkyl radicals having from 1 to 4 carbon atoms, and the 3rd alkyl has from 4 to 12 carbon atoms or is five- or six-membered cycloalkyl. The formulations have adequate free-flowing properties even at a relatively high diamine content and produce moldings having high heat distortion resistance with no progressive fall in the shear modulus curve between 100° and 200° C.

These processes all have the disadvantage that the reactivity difference in the addition reaction with isocyanate groups is considerable between the relatively high-molecular weight compounds containing two or more primary hydroxyl groups and the aromatic diamines, in spite of steric hindrance of the amino groups, and can only be overcome by using synergistically active catalyst combinations of tertiary amines and metal salts, for example dibutyltin dilaurate, to accelerate the hydroxyl/isocyanate polyaddition reaction. However, polyurethane-polyurea elastomers prepared using metal salt catalysts depolymerize at above 150° C., and exposure to high temperatures for a relatively long duration can result in complete destruction of the mechanical properties of the material.

The partial or exclusive use of polyoxyalkylene-polyamines having molecular weights of from 1100 to 16000 for preparation of elastic polyurethane-polyurea or polyurea elastomers is also known, for example from EP-A-033,498 (U.S. Pat. No. 4,269,945), EP-A-81,701, EP-A-93,861, (U.S. Pat. No. 4,396,729), EP-A-92,672, EP-A-93,862 (U.S. Pat. Nos. 4,444,910 and 4,433,067), EP-A-93,334 and EP-A-93,336.

In EP-A-81,701 mentioned above as an example, relatively high-molecular-weight polyoxyalkylene-polyamines containing amino groups bonded to aliphatic or aromatic radicals are used. However, aliphatic polyoxyalkylene-polyamines are known to be extremely reactive, which means that the processing of RIM formulations on this basis can result in considerable problems as far as the machinery is concerned, for example due to the short times available for injection and the attendant low material output rate, in particular in the production of large-volume moldings. Polyoxyalkylene-polyamines containing aromatically bound amino groups react somewhat more slowly than aliphatic polyoxyalkylene-polyamines. These compounds have the disadvantage of expensive preparation in multi-step processes and, in particular, relatively high viscosity, for example of greater than 20,000 mPas at 25° C., which can cause considerable problems in the processing of formulations containing reinforcing agents.

EP-A-0,298,359 states that elastomers containing N-alkylurea units or N-alkylurea and urethane units in bound form can be prepared by reacting polyisocyanates with chain extenders and N-alkylpolyoxyalkylene-polyamines having from 2 to 12 carbon atoms in the alkyl. Formulations contained in these components can also be processed to form moldings by the RIM technique. However, they have the disadvantage that the reaction mixtures obtained have only poor flow properties due to the high amine reactivity, which means that the filling of large mold volumes is unsatisfactory, in particular if the mold geometry has a narrow cross-section.

Furthermore, U.S. Pat. Nos. 4,048,105, 4,102,833 and 4,374,210 disclose the use in polyurethane systems of isocyanate-containing prepolymers and quasiprepolymers having NCO contents of from 9 to 31% by weight prepared using modified or unmodified 4,4'-diphenylmethane diisocyanate.

By selecting suitable relatively high-molecular-weight compounds containing two or more reactive hydrogen atoms, for example polyether- and/or polyester-polyols, polyoxyalkylene-polyamines containing primary amino groups bound to aliphatic or aromatic radicals, or in particular appropriately substituted aromatic primary diamines as chain extenders, and specific catalysts or catalyst systems, attempts have been made to match the RIM formulations to the given requirements, for example the volume and geometry of the mold. However, this method has the disadvantage that the starting compounds employed affect not only the reactivity of the RIM formulations, but also the mechanical properties of the moldings obtained, which means that moldings having certain spatial geometries and relatively large dimensions can in some cases only be produced with impaired mechanical properties, or not at all, since the reaction mixtures are, for example, not sufficiently free flowing or cannot be introduced into the mold in the amounts required.

It is an object of the present invention to develop reaction mixtures having improved flow properties and similar mold penetration compared with previously known polyurea systems, so that, on the one hand, high-volume molds having difficult spatial geometries can easily be filled and, on the other hand, short mold residence times can be achieved due to the rapid curing of the molding. In addition, the novel elastomers should have comparable mechanical and thermal properties with known elastomers containing polyurea groups, but should have, in particular, improved elongation properties and increased tear propagation strength.

We have found that, surprisingly, this object is achieved by using N-benzylpolyoxyalkylene-polyamines as the high-molecular-weight compound containing reactive hydrogen atoms, it being possible for these to be substituted on the benzyl radical and to be used in the form of mixtures with polyoxyalkylene-polyamines containing two or more primary amino groups.

Accordingly, the invention provides a process for the production of elastic, compact or cellular moldings based on elastomers containing N-benzylurea groups in bound form, by reacting a) one or more organic and/or modified organic polyisocyanates, preferably an aromatic polyisocyanate and/or a modified aromatic polyisocyanate mixture having an NCO content of from 8 to 33.6% by weight, based on the weight of the polyisocyanate mixture, with b) one or more secondary polyoxyalkylene-polyamines and c) one or more alkyl-substituted aromatic polyamines having a molecular weight of up to 500, in the presence or absence of d) catalysts and, if desired, e) blowing agents, f) auxiliaries and/or g) additives, in which the secondary polyoxyalkylene-polyamines used are N-benzylpolyoxyalkylene-polyamines.

The invention furthermore provides specific embodiments of the process according to the invention as claimed in claims 2 to 11, the secondary polyoxyalkylene-polyamines (b) employed advantageously being mixtures of N-benzylpolyoxyalkylene-polyamines and polyoxyalkylene-polyamines containing from 2 to 4 primary amino groups, and compact or cellular moldings preferably being produced by the RIM technique in a closed, temperature-controlled mold.

The invention furthermore provides the novel N,N'-dibenzylpolyoxyalkylene-diamines having a molecular weight of from 410 to 8,000 as claimed in claim 12, N,N',N''-tribenzylpolyoxyalkylene-triamines having a molecular weight of from 662 to 8,000 as claimed in claim 13, mixtures of the preferred N,N'-dibenzylpolyoxyalkylene-polyamines and/or N,N',N''-tribenzylpolyoxyalkylenetriamines and polyoxyalkylene-polyamines containing 2 or 3 primary amino groups as claimed in claim 14, and the elastomers containing N-benzylurea groups in bound form, prepared by reacting a) one or more organic and/or modified organic polyisocyanates with b) one or more N-benzylpolyoxyalkylene-polyamines or a mixture of one or more N-benzylpolyoxyalkylene-polyamines and one or more polyoxyalkylene-polyamines containing from 2 to 4 primary amino groups, and c) one or more alkyl-substituted aromatic polyamines having a molecular weight of up to 500, in the presence or absence of one or more catalysts as claimed in claim 15.

The elastic moldings produced according to the invention and based on elastomers containing N-benzylurea groups in bound form have significantly improved elongation at break, a low modulus of elasticity, and increased heat distortion resistance. The moldings obtained exhibit considerably fewer processing faults, e.g. hammered finish surface appearance or porosity, and have good non-stick properties, which means that even relatively large moldings can easily be demolded after only short mold residence times, preferably after from 10 to 30 seconds. The novel N-benzylpolyoxyalkylene-polyamines which can be used according to the invention form, together with the other starting materials and, if desired, catalysts, blowing agents, auxiliaries and additives, formulations having improved flow properties and an extended gelling time, which means that the output from commercially available high-pressure injection molding machines can be significantly increased and that filling of even large-volume molds presents no difficulties.

The following details apply to the starting materials which can be used for the preparation of the elastomers containing N-benzylurea groups in bound form and to the moldings comprising these elastomers.

a) Suitable organic polyisocyanates are conventional aliphatic, cycloaliphatic and, preferably, aromatic polyisocyanates. Specific examples which may be mentioned are 1,6-hexamethylene diisocyanate, 1-isocyanato-3,5,5-trimethyl-3-isocyanatomethyl-cyclohexane, 2,4- and 2,6-hexahydrotolylene diisocyanate and the corresponding isomer mixtures, 4,4'-, 2,2'- and 2,4'-dicyclohexylmethane diisocyanate and the corresponding isomer mixtures, mixtures of 4,4'-, 2,2'- and 2,4'-dicyclohexylmethane diisocyanates and polymethylene-polycyclohexylene polyisocyanates, 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'-, and 2,4'- and 2,2'-diphenylmethane diisocyanates and polyphenylpolymethylene polyisocyanates (crude MDI) and mixtures of crude MDI and tolylene diisocyanates.

So-called modified polyisocyanates, i.e. products obtained by chemical reaction of the above diisocyanates and/or polyisocyanates, are frequently also used. Examples which may be mentioned are diisocyanates and/or polyisocyanates containing ester, urea, biuret, allophanate and, preferably, carbodiimide, isocyanurate and/or urethane groups. Specific examples are aromatic polyisocyanates containing urethane groups and having NCO contents of from 33.6 to 8% by weight, preferably from 31 to 21% by weight, for example 4,4'-diphenylmethane diisocyanate or tolylene diisocyanate modified with low-molecular-weight diols, triols, oxyalkylene glycols, dioxyalkylene glycols, polyoxyalkylene glycols having molecular weights of up to 800, the following being examples of dioxyalkylene glycols or polyoxyalkylene glycols, which can be employed individually or as mixtures: diethylene glycol, dipropylene glycol, polyoxyethylene glycols, polyoxypropylene glycols and polyoxypropylene-polyoxyethylene glycols. Prepolymers containing NCO groups and having NCO contents of from 25 to 8% by weight, preferably 21 to 14% by weight, are also suitable. Furthermore, liquid polyisocyanates containing carbodiimide groups and/or isocyanate rings and having NCO contents of from 33.6 to 8% by weight, preferably from 31 to 21% by weight, for example based on 4,4'-, 2,4'- and/or 2,2'-diphenylmethane diisocyanate and/or 2,4- and/or 2,6-tolylene diisocyanate and, preferably, 2,4- and 2,6-tolylene diisocyanate, and the corresponding isomer mixtures, 4,4'-, 2,4'- and 2,2'-diphenylmethane diisocyanate and the corresponding isomer mixtures, for example of 4,4'- and 2,4'-diphenylmethane diisocyanates, crude MDI and mixtures of tolylene diisocyanates and crude MDI, are also suitable.

However, the following are used in particular: (i) carbodiimide- and/or urethane-containing polyisocyanates made from 4,4'-diphenylmethane diisocyanate or a mixture of 4,4'- and 2,4'-diphenylmethane diisocyanates and having an NCO content of from 33.6 to 8% by weight, (ii) NCO-containing prepolymers having an NCO content of from 8 to 25% by weight, based on the prepolymer weight, and prepared by reacting polyoxyalkylene-polyols having a functionality of from 2 to 4 and having a molecular weight of from 600 to 6000 with 4,4'-diphenylmethane diisocyanate or a mixture of 4,4'- and 2,4'-diphenylmethane diisocyanates, and mixtures of (i) and (ii).

As stated above, suitable compounds for the preparation of the NCO-containing prepolymers are polyoxyalkylene-polyols having a functionality of from 2 to 4, preferably of 2 or 3 and in particular of 3, and having a molecular weight of from 600 to 6000, preferably from 2800 to 4500. Analogous polyoxyalkylene-polyols having molecular weights of from approximately 220 to 8000 are employed for the preparation of polyoxyalkylene-polyamines and suitable starting materials for the preparation of the N-benzyl-polyoxyalkylene-polyamines (b). Polyoxyalkylene-polyols of this type can be prepared from one or more alkylene oxides having from 2 to 4 carbon atoms in the alkylene radical and an initiator molecule containing from 2 to 4, preferably 2 or 3, reactive hydrogen atoms in bound form, by conventional processes, for example by anionic polymerization using alkali metal hydroxides, such as sodium hydroxide or potassium hydroxide, or alkali metal alcoholates, such as sodium methylate, sodium ethylate, potassium ethylate or potassium isopropylate, as catalysts or by cationic polymerization using Lewis acids, such as antimony pentachloride, boron trifluoride etherate inter alia, or bleaching earths as catalysts.

Examples of suitable alkylene oxides are tetrahydrofuran, 1,3-propylene oxide, 1,2- or 2,3-butylene oxide and, preferably, ethylene oxide and 1,2-propylene oxide. The alkylene oxides may be used individually, one after the other in an alternating manner or as mixtures. Examples of suitable initiator molecules are water, organic dicarboxylic acids, such as succinic acid, adipic acid, phthalic acid and terephthalic acid, aliphatic and aromatic, unsubstituted or N-monosubstituted or N,N- and N,N'-dialkyl-substituted diamines having from 1 to 4 carbon atoms in the alkyl radical, such as unsubstituted or mono- and dialkyl-substituted ethylenediamine, diethylenetriamine, triethylenetetraamine, 1,3-propylenediamine, 1,3- and 1,4-butylenediamine, 1,2-, 1,3-, 1,4-, 1,5- and 1,6-hexamethylene diamine, phenylenediamines, 2,4- and 2,6-toluylenediamine and 4,4'-, 2,4'- and 2,2'-diaminodiphenylmethane.

Furthermore, suitable initiator molecules are alkanolamines, e.g. ethanolamine, diethanolamine, N-methyl- and N-ethylethanolamine, N-methyl- and N-ethyldiethanolamine and triethanolamine, and also ammonia. Polyhydric, in particular dihydric and/or trihydric alcohols, such as ethanediol, propane-1,2-diol, propane-1,3-diol, diethylene glycol, dipropylene glycol, butane-1,4-diol, hexane-1,6-diol, glycerol, trimethylolpropane and pentaerythritol are preferably used.

The polyoxyalkylene-polyols can be used individually or in the form of mixtures.

b) The secondary polyoxyalkylene-polyamines (b) used are N-benzylpolyoxyalkylene-polyamines according to the invention. N-Benzylpolyoxyalkylene-polyamines which are substituted on the benzyl radical, e.g. by fluorine, chlorine, alkyl, alkoxy, nitro or preferably amino or carboxyl, are also suitable, but the unsubstituted N-benzylpolyoxyalkylene-polyamines are preferred. Preference is given to N-benzylpolyoxyalkylene-polyamines containing from 2 to 4, preferably 2 or 3, N-benzylamino groups which are unsubstituted or substituted on the benzyl radical and having a molecular weight of from 410 to 8,000, preferably from 1,600 to 4,500. Particular preference is given to N,N'-dibenzylpolyoxyalkylene-diamines having a molecular weight of from 410 to approximately 8,000, and to N,N',N''-tribenzylpolyoxyalkylene-triamines having a molecular weight of from 662 to approximately 8,000, or mixtures of these N-benzylpolyoxyalkylene-diamines and -triamines, the polyoxyalkylene radicals expediently being selected from the group comprising the polyoxyethylene, polyoxypropylene, polyoxytetramethylene, polyoxypropylene-polyoxyethylene, polyoxytetramethylene-polyoxypropylene and/or polyoxyethylene radicals and preferably the polyoxypropylene and polyoxypropylene-polyoxyethylene radicals.

The novel N-benzylpolyoxyalkylene-polyamines which are unsubstituted or substituted on the benzyl radical and can be used according to the invention can be prepared, for example, by reacting the above-mentioned polyoxyalkylene-polyamines containing from 2 to 4 primary amino groups with a benzaldehyde which is substituted on the phenyl radical or is preferably unsubstituted, to give polyoxyalkylene-di-bis-tetraaldimines, which are subsequently hydrogenated to give the N-benzylpolyoxyalkylene-polyamines which can be used according to the invention.

The preferred polyoxyalkylene-polyamines containing amino groups bonded to aliphatic radicals used to prepare the N-benzylpolyoxyalkylene-polyamines can be prepared by conventional processes, for example by cyanoalkylating the polyoxyalkylene-polyols described and subsequently hydrogenating the resultant nitrile (U.S. Pat. No. 3,267,050) or by aminating polyoxyalkylenepolyols using ammonia in the presence of hydrogen and catalysts (DE-A-1,215,373).

Suitable polyoxyalkylene-polyamines containing amino groups bonded to aromatic radicals can be prepared, for example, by reacting the above-described polyalkylene-polyols with aromatic polyisocyanates in an NCO:OH ratio of 2 or more and subsequently hydrolyzing the aromatic NCO-containing prepolymers to give polyamines in a manner similar to the processes of DE-A-2,948,419, DE-A-2,039,600, EP-A-84,141, EP-A-79,512, EP-A-97,290, EP-A-97,298, EP-A-97,299, EP-A-99,537, EP-A-113,027, EP-A-113,020 or EP-A-154,768.

The polyoxyalkylene-polyamines can be used as individual compounds or in the form of mixtures of products having different molecular weights and functionalities. When low-molecular-weight polyoxyalkylene-polyols, for example low-molecular-weight polyoxytetramethylene glycols, are used as the starting components, it is necessary for the resultant polyoxyalkylene-polyamines to be mixed with relatively high-molecular-weight polyoxyalkylenepolyamines in such an amount that the mean molecular weight is from about 260 to about 8000 at a functionality of from 2 to 4. Other polyoxyalkylene-polyamines which can be used are mixtures of polyoxyalkylene-polyols and polyoxyalkylene-polyamines and/or partially aminated polyoxyalkylene-polyols, with the proviso that 50% or more, preferably 64% or more, in particular 90% or more, of the reactive end groups are amino groups, of which 85% or more, preferably 90% or more, are primary amino groups.

The other starting component used for the preparation of the polyoxyalkylene-polyaldimines is preferably benzaldehyde. However, it is also possible to use other substituted benzaldehydes, e.g. benzaldehyde substituted by fluorine and/or chlorine, nitro, alkyl and alkoxy having from 1 to 12 carbon atoms, or preferably by amino or carboxyl.

For the preparation of the polyoxyalkylene-polyaldimines, the polyoxyalkylene-polyamines, preferably polyoxyalkylene-diamines and/or -triamines are mixed with a substituted or unsubstituted benzaldehyde, advantageously in an $-NH_2/-CHO$ ratio of 1:1 to 5, preferably 1:1.1 to 4, in particular 1:1.1 to 2, and, after adding a suitable solvent or diluent, e.g. toluene, xylene, benzene, methylene chloride, dichloroethane, cyclohexane, n-hexane or heptane and, if desired, an inorganic or organic acid, e.g. hydrochloric acid, formic acid, benzoic acid or arylsulfonic acid, e.g. p-toluenesulfonic acid, as catalyst, the mixture is expediently heated on a water separator in the presence of a gas which is inert under the reaction conditions until the amount of water which is theoretically expected or, in the case of a partial reaction, which is desired has been separated off. Reaction times of from 1 to 60 hours, preferably from 5 to 40 hours, are usually necessary for this purpose. Processes of this type are described, for example, in Houben-Weyl, Methoden der organischen Chemie, Volume VII/2b, Part II, Georg Thieme Verlag, Stuttgart 1976, 4th Edn., pages 1948 ff.

Purification of the polyoxyalkylene-polyaldimines, for example by filtration, before hydrogenation thereof is usually not necessary. The polyoxyalkylene-polyaldimines can be hydrogenated directly to give the N-benzylpolyoxyalkylene-polyamines which can be used according to the invention after removal of the excess substituted or unsubstituted benzaldehyde by distillation and, if the condensation has been carried out in the presence of a solvent or diluent which is unsuitable for the subsequent hydrogenation, after removal by distillation of the solvent or diluent preferably employed.

The hydrogenation of the polyoxyalkylene-polyaldimines can be carried out by conventional methods, for example in the presence of catalysts in solution or preferably in the absence of solvent at elevated temperatures under atmospheric pressure or preferably under superatmospheric pressure. In a preferred process, the polyoxyalkylene-polybenzylimines are hydrogenated at from 60° to 200° C., preferably from 100° to 160° C., and under a pressure of from 20 to 500 bar, preferably from 150 to 230 bar, for from 2 to 50 hours, preferably from 5 to 18 hours, in the presence of a Raney nickel in the absence of a solvent. The hydrogenation mixture obtained is subsequently filtered under superatmospheric pressure, and the volatile constituents are removed from the filtrate under reduced pressure at from 100° to 200° C. The N-benzylpolyoxyalkylene-polyamines obtained can be employed directly, without further purification, for the preparation of the elastomers containing N-benzylurea groups in bound form.

In another preparation method, the polyoxyalkylene-polyols can also be aminated directly with benzylamine in the presence of catalysts and hydrogen to give N-benzylpolyoxyalkylene-polyamines.

In the production of the elastic, compact or cellular moldings based on elastomers containing N-benzylurea groups in bound form, the N-benzylpolyoxyalkylene-polyamines (bi) can also be replaced by mixtures of the N-benzylpolyoxyalkylene-polyamines (bi) which are suitable according to the invention and the above-described polyoxyalkylene-polyamines (bii). Mixtures of this type can be obtained, for example, by mixing pre-prepared N-benzylpolyoxyalkylene-polyamines (bi) with polyoxyalkylene-polyamines (bii). In another process variant, the polyoxyalkylene-polyamines containing from 2 to 4 primary amino groups are reacted with an excess of unsubstituted or substituted benzaldehyde, so that only some of the amino groups present are converted into benzaldimine groups, and the polyoxyalkylene-polyaldimines still containing primary amino groups are subsequently hydrogenated in a conventional manner.

Examples of suitable mixtures are N-benzylpolyoxyalkylene-polyamines (bi) and polyoxyalkylene-polyamines (bii) in such amounts that the mixtures contain from 10 to 90%, preferably from 30 to 80%, in particular from 40 to 70%, of the N-benzylamino groups of the N-benzylpolyoxyalkylene-polyamines and from 90 to 10%, preferably from 20 to 70%, in particular from 30 to 60%, of primary amino groups of polyoxyalkylene-polyamines containing from 2 to 4, preferably 2 or 3, primary amino groups and having a molecular weight of from 1,100 to 8,000, preferably from 1,600 to 4,500, the percentages being based on the sum of N-benzylamino groups and primary amino groups.

Particularly successful, and therefore preferred, polyoxyalkylene-polyamine mixtures are those which contain from 10 to 90% of benzylamino groups of N,N'-dibenzylpolyoxyalkylene-diamines, N,N',N''-tribenzylpolyoxyalkylene-triamines or mixtures of these N-benzylpolyoxyalkylene-polyamines having molecular weights of from 410 to 8,000, and from 10 to 90% of primary amino groups of one or more polyoxyalkylene-polyamines having 2 and/or 3 primary amino groups and a molecular weight of from 1,100 to 8,000, the polyoxyalkylene radicals being selected from the group comprising the polyoxypropylene-polyoxyethylene, polyoxytetramethylene and preferably polyoxypropylene radicals, and the percentages being based on the sum of N-benzylamino groups and primary amino groups.

(c) The alkyl-substituted aromatic polyamines having molecular weights of up to 500, preferably of from 120 to 400, are expediently primary aromatic diamines which contain, in the ortho-position to the amino groups, one or more alkyl substituents which reduce the reactivity of the amino group through steric hindrance, are liquid at room temperature and are at least partially, but preferably fully miscible with the N-benzylpolyoxyalkylene-polyamines or the mixtures of N-benzylpolyoxyalkylene-polyamines and polyoxyalkylene-polyamines containing primary amino groups (b) under the processing conditions. Examples of compounds which have proved successful are alkyl-substituted meta-phenylenediamines of the formulae

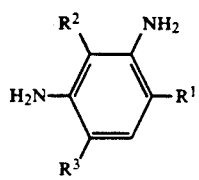

and/or

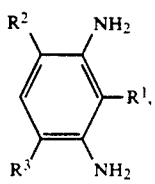

where $R^3$ and $R^2$ are identical or different methyl, ethyl, propyl or isopropyl, and $R^1$ is linear or branched alkyl having from 1 to 10, preferably from 1 to 6, carbon atoms. Branched alkyl $R^1$ having from 4 to 6 carbon atoms in which the branch is on the $C_1$ carbon have also proven successful. Specific examples of $R^1$ radicals are methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl, cyclohexyl, 1-methyl-n-propyl, tert.-butyl, 1-ethyl-n-propyl, 1-methyl-n-butyl and 1,1-dimethyl-n-propyl.

Examples of suitable alkyl-substituted m-phenylenediamines are 2,4-dimethyl-6-cyclohexyl-, 2-cyclohexyl-4,6-diethyl-, 2-cyclohexyl-2,6-diisopropyl-, 2,4-dimethyl-6-(1-ethyl-n-propyl)-, 2,4-dimethyl-6-(1,1-dimethyl-n-propyl)-and 2-(1-methyl-n-butyl)-4,6-dimethyl-phenylene-1,3-diamine. Preference is given to 1-methyl-3,5-diethyl-2,4- and/or -2,6-dimethyl-6-isooctyl-and 2,4-dimethyl-6-cyclohexyl-phenylene-1,3-diamine.

3,3'-di- and/or 3,3',5,5'-tetra-n-alkyl-substituted 4,4'-diaminodiphenylmethanes, e.g. 3,3'-dimethyl-, 3,3'-diethyl-, 3,3'-di-n-propyl-, 3,3',5,5'-tetramethyl-, 3,3',5,5'-tetraethyl-and 3,3',5,5'-tetra-n-propyl-4,4'diaminodiphenylenemethane are also suitable.

Preferred alkyl-substituted 4,4'-diaminodiphenylmethanes are those of the formula

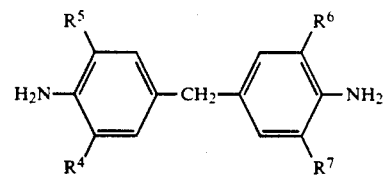

where $R^4$, $R^5$, $R^6$ and $R^7$ are identical or different methyl, ethyl, propyl, isopropyl, sec.-butyl or tert.-butyl, but where one or more of the radicals must be isopropyl or sec.-butyl. The 4,4'-diaminodiphenylmethanes can also be used mixed with isomers of the formulae

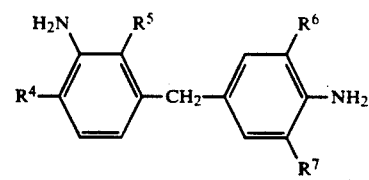

and/or

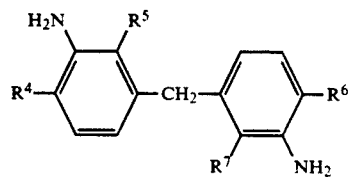

where $R^4$, $R^5$, $R^6$ and $R^7$ are as defined above.

Specific examples are 3,3',5-trimethyl-5'-isopropyl-, 3,3',5-triethyl-5'-isopropyl, 3,3',5-trimethyl-5'-sec.-butyl- and 3,3',5-triethyl-5'-sec.-butyl-4,4'-diaminodiphenylmethane, 3,3'-dimethyl-5,5'-diisopropyl-, 3,3'-diethyl-5,5'-diisopropyl-, 3,3'-dimethyl-5,5'-di-sec.-butyl-, 3,3'-diethyl-5,5'-di-sec.-butyl-, 3,5-dimethyl- 3',5'-diisopropyl-, 3,5-diethyl-3',5'-diisopropyl-, 3,5'-dimethyl-3',5'-di-sec.-butyl- and 3,5'-diethyl-3',5'-di-sec.-butyl-4,4'-diaminodiphenylmethane, 3-methyl-3',5,5'-triisopropyl-, 3-ethyl-3'5,5'-triisopropyl-, 3-methyl-3'-ethyl-5,5'-diisopropyl-, 3-methyl-3',5,5'-tri-sec.-butyl- and 3-ethyl-3',5,5'-tri-sec.-butyl-4,4'-diaminodiphenylmethane, 3,3'-diisopropyl-5,5'-di-sec.-butyl-, 3,5-diisopropyl-3',5'-di-sec.-butyl-, 3-ethyl-5-sec.-butyl-3',5'-diisopropyl-, 3-methyl-5-tert.-butyl-3'5'-diisopropyl-, 3-ethyl-5-sec.-butyl-3'-methyl-5'-tert.-butyl-, 3,3',5,5'-tetraisopropyl- and 3,3',5,5'-tetra-sec.-butyl-4,4'-diaminodiphenylmethane. Preference is given to 3,5-dimethyl-3',5'-diisopropyl- and 3,3',5,5'-tetraisopropyl-4,4'-diaminodiphenylmethane. The diaminodiphenylmethanes can be employed individually or in the form of mixtures.

To prepare the elastomers containing N-benzylurea groups in bound form and to produce moldings therefrom, the industrially readily accessible 1,3,5-triethyl-2,4-phenylenediamine, 1-methyl-3,5-diethyl-2,4-phenylenediamine, mixtures of 1-methyl-3,5-diethyl-2,4- and 2,6-phenylenediamines, so-called DETDA, isomer mixtures of 3,3'-di- or 3,3',5,5'-tetraalkyl-substituted 4,4'-diaminodiphenylmethanes having from 1 to 4 carbon atoms in the alkyl, in particular 3,3',5,5'-tetraalkyl-substituted 4,4'-diaminodiphenylmethanes containing methyl, ethyl and isopropyl in a bound form, and mixtures of the tetraalkyl-substituted 4,4'-diaminodiphenylmethanes mentioned and DETDA are preferably used.

In order to achieve specific mechanical properties, it may also be expedient to use the abovementioned alkyl-substituted aromatic polyamines (c) mixed with low-molecular-weight polyhydric alcohols, preferably dihydric and/or trihydric alcohols, or ether glycols. Examples of polyhydric alcohols and ether glycols of this type are alkanediols, preferably having from 2 to 6 carbon atoms, in particular ethanediol, 1,4-butanediol, 1,6-hexanediol, glycerol, trimethylolpropane, diethylene glycol or dipropylene glycol, or mixtures of two or more of the compounds mentioned. It is disadvantageous in this procedure that the reaction requires careful catalysis due to the varying reactivity of the primary and secondary amino groups and of the hydroxyl groups. If low-molecular-weight polyhydric alcohols can be used at all, it has proven expedient to use a maximum of 50% by weight, preferably less than 20% by weight, based on the weight of the alkyl-substituted aromatic polyamines (c).

To prepare the elastomers according to the invention, the organic polyisocyanates and/or modified polyisocyanate mixtures (a), secondary polyoxyalkylene-polyamines (b) and alkyl-substituted primary aromatic polyamines (c) are reacted in such amounts that the equivalent ratio between the NCO groups of component (a) and the sum of the reactive hydrogen atoms of components (b) and (c) is from 0.85 to 1.25:1, preferably from 0.95 to 1.15:1 and in particular from 0.98 to 1.10:1, and the ratio between N-benzylamino groups or the sum of the N-benzylamino groups and primary amino groups of component (b) and the primary aromatic amino groups of component (c) is from 90:10 to 10:90, preferably from 40:60 to 15:85. If the reaction mixture additionally contains hydroxyl groups, they are identical with amino groups as far as the equivalent ratio is concerned.

d) The elastomers according to the invention containing N-benzylurea groups in bound form are preferably prepared in the absence of catalysts. However, if catalysts are used, they are, in particular, highly basic amines, the absence of synergistic organometallic compounds, for example organotin compounds, being absolutely necessary to produce heat-resistant moldings which can be subjected to online painting. Specific examples of suitable catalysts are amidines, e.g. 2,3-dimethyl-3,4,5,6-tetrahydropyrimidine, and tertiary amines, e.g. triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane.

Other suitable catalysts are tris(dialkylaminoalkyl)-s-hexahydrotriazines, in particular tris(N,N-dimethylaminopropyl)-s-hexahydrotriazine, tetraalkylammonium hydroxides, eg. tetramethylammonium hydroxide, alkali metal hydroxides, eg. sodium hydroxide, and alkali metal alcoholates, eg. sodium methylate and potassium isopropylate, and the alkali metal salts of long-chain fatty acids having from 10 to 20 carbon atoms, with or without internal OH groups. From 0.001 to 5% by weight, preferably from 0.05 to 2% by weight, of catalyst, based on the weight of component (b), are usually used.

To produce elastic moldings based on elastomers according to the invention containing N-benzylurea groups, blowing agents (e) may be introduced into the reaction mixture of components (a) to (c) and, if desired, (d) in order to achieve cellular moldings, as can, if desired, auxiliaries (f) and/or additives (g).

e) An example of a suitable blowing agent for the production of cellular moldings is water, which reacts with isocyanate groups to form carbon dioxide. The amount of water which can expediently be used is from 0.1 to 1.0% by weight, preferably from 0.2 to 0.4% by weight, based on the weight of components (b) and (c).

Other blowing agents which can be used are low-boiling liquids which evaporate during the exothermic polyaddition reaction. Suitable liquids are those which are inert toward the organic polyisocyanate and have a boiling point of less than 100° C. Examples of preferred liquids of this type are halogenated hydrocarbons, such as methylene chloride, trichlorofluoromethane, dichlorodifluoromethane, dichloromonofluoromethane, dichlorotetrafluoroethane, 1,1,2-trichloro-1,2,2-trifluoroethane, trifluoromethane, difluoromethane, difluoroethane, tetrafluoroethane and heptafluoropropane, hydrocarbons, such as n- and isobutane, n- and iso-pentane and technical-grade mixtures of these hydrocarbons, propane, propylene, hexane, heptane, cyclobutane, cyclopentane, cyclohexane, dialkyl ethers, such as dimethyl ether, diethyl ether and furan, carboxylic acid esters, such as methyl formate and ethyl formate, and acetone. Mixtures of these low-boiling liquids with one another or with other substituted or unsubstituted hydrocarbons can also be used.

The most expedient amount of low-boiling liquid for the production of cellular moldings from elastomers containing N-benzylurea groups depends on the desired density and, where appropriate, on the presence of water. In general, amounts of from 1 to 15% by weight, preferably from 2 to 11% by weight, based on the weight of components (b) and (c) give satisfactory results.

(f) and (g) Specific examples of suitable auxiliaries (f) and or additives (g) are surface-active substances, foam stabilizers, cell regulators, fillers, reinforcing agents, flameproofing agents, external and/or internal release agents, dyes, pigments, hydrolysis-protection agents, and fungistatic and bacteriostatic substances.

Suitable surface-active substances are compounds which are used to support homogenization of the starting materials and, if appropriate, are also suitable for regulating cell structure. Specific examples are emulsifiers, such as the sodium salts of castor oil sulfates or of fatty acids, and salts of fatty acids with amines, eg. diethylamine oleates, diethanolamine stearate and diethanolamine ricinoleate, salts of sulfonic acids, eg. alkali metal or ammonium salts of dodecylbenzene- or dinaphthylmethanedisulfonic acid and ricinoleic acid; foam stabilizers, such as siloxane-oxaalkylene copolymers and other organopolysiloxanes, oxyethylated alkylphenols, oxyethylated fatty alcohols, paraffin oils, castor oil esters, ricinoleic acid esters, turkey red oil and groundnut oil, and cell regulators, such as paraffins, fatty alcohols and dimethylpolysiloxanes. The surface-active substances are usually used in amounts of from 0.01 to 5 parts by weight, based on 100 parts by weight of components (b) and (c).

For the purposes of the invention, fillers, in particular reinforcing fillers, are conventional organic and inorganic fillers, reinforcing agents, weighting agents, agents for improving the abrasion behavior in paints, coating agents, etc. Specific examples are inorganic fillers, such as silicate minerals, for example phyllosilicates, such as antigorite, serpentine, hornblendes, amphiboles, chrysotile, talc and zeolites, metal oxides, such as kaolin, alumina, titanium oxides and iron oxides, metal salts, such as chalk and feldspar, and inorganic pigments, such as cadmium sulfide and zinc sulfide, and glass, inter alia. Preference is given to kaolin (china clay), aluminum silicate and coprecipitates of barium sulfate and aluminum silicate, and natural and synthetic fibrous minerals, such as wollastonite and, in particular, glass fibers of various lengths, which may be sized. Examples of suitable organic fillers are charcoal, carbon fibers, melamine, collophonium, cyclopentadienyl resins and graft polymers based on styrene-acrylonitrile, which are prepared by in-situ polymerization of acrylonitrilestyrene mixtures in polyoxyalkylenepolyols in a similar manner to those given in German Patents 1,111,394, 1,222,669 (U.S. Pat. Nos. 3,304,273, 3,383,351, and 3,523,093), 1,152,536 (GB 1,040,452) and 1,152,537 (GB 987,618) and then aminated, and also filler-polyoxyalkylene-polyamines in which aqueous polymer dispersions are converted into polyoxyalkylene-polyamine dispersions.

The inorganic and organic fillers can be used individually or as mixtures. Preference is given to unsized or sized short glass fibers having lengths of less than 0.4 mm, preferably of less than 0.2 mm.

The inorganic and/or organic fillers and/or reinforcing agents are advantageously incorporated into the reaction mixture in amounts of from 0.5 to 35% by weight, preferably from 3 to 20% by weight, based on the weight of components (a) to (c).

Examples of suitable flameproofing agents are tricresyl phosphate, tris-2-chloroethyl phosphate, tris-chloropropyl phosphate and tris-2,3-dibromopropyl phosphate.

In addition to the abovementioned halo-substituted phosphates, it is also possible to use inorganic flameproofing agents, eg. aluminum oxide hydrate, antimony trioxide, arsenic oxide, ammonium polyphosphate and calcium sulfate, or melamine or mixtures thereof for flameproofing the moldings. In general, it has proved expedient to use from 5 to 50 parts by weight, preferably from 5 to 25 parts by weight, of the flameproofing agents mentioned per 100 parts by weight of components (b) and (c).

Further details on the other conventional auxiliaries and additives mentioned above can be obtained from the literature, for example from the Monograph by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Hanser-Verlag, Munich, Vienna, 1st and 2nd Editions, 1966 and 1983.

The elastic, compact moldings based on the elastomers according to the invention containing N-benzylurea groups are expediently produced by the one-shot process using the low-pressure method or in particular by reaction injection molding (RIM) in open or preferably closed molds. Cellular moldings are produced by carrying out the reaction, in particular, with compaction in a closed mold. Reaction injection molding is described, for example, by H. Piechota and H. Röhr in Integralschaumstoffe, Carl Hanser-Verlag, Munich, Vienna, 1975; D. J. Prepelka and J. L. Wharton in Journal of Cellular Plastics, March/April 1975, pages 87 to 98, and U. Knipp in Journal of Cellular Plastics, March/April 1973, pages 76-84.

When a mixing chamber having several feed nozzles is used, the starting components can be fed in individually and mixed vigorously in the mixing chamber. It has proven particularly advantageous to use the two-component method, combining components (b) and (c) and, if desired, (d) to (g) in components (A) and using, as component (B), organic polyisocyanates or modified polyisocyanate mixtures. It is advantageous here, for example, that components (A) and (B) can be stored separately and transported using a minimum of space and that only the appropriate amounts need be mixed during processing.

The amount of reaction mixture introduced into the mold is such that the moldings obtained, which may be cellular, have a density of from 250 to 1400 kg/m$^3$, the compact moldings preferably having a density of from 1000 to 1400 kg/m$^3$, in particular from 1000 to 1200 kg/m$^3$, and the cellular and microcellular moldings preferably having a density of from 400 to 1100 kg/m$^3$, for example from 450 to 750 kg/m$^3$, in particular from 550 to 650 kg/m$^3$, for shoe soles, and from 700 to 1200 kg/m$^3$, in particular from 950 to 1150 kg/m$^3$, for panelling elements. The starting components are introduced into the mold at from 15° to 80° C., preferably from 30° to 65° C. The mold temperature is expediently from 20° to 110° C., preferably from 35° to 95° C. and in particular from 35° to 75° C. The degree of compaction for the production of microcellular or cellular moldings is from 1.1 to 8, preferably from 2 to 6.

Although the elastomer moldings produced according to the invention are easy to demold, it may be advantageous to improve demolding by coating the internal surfaces of the mold, at least at the beginning of a production run, with conventional external mold-release agents, for example based on wax or silicone, or, in particular, with aqueous soap solutions. However, internal mold-release agents, as described, for example, in EP-A-153,649, EP-A-180,749 (AU 85/47,498), EP- A-173,888 (U.S. Pat. No. 4,519,965), WO 84/03,288 (EP-A-119,471) and WO 86/01.215, have proven particularly successful and are therefore preferred. The mold residence times are on average from 3 to 60 seconds, depending on the size and geometry of the molding.

The elastomers according to the invention containing N-benzylurea groups in bound form are distinguished by good mechanical properties and have a green density, measured in accordance with DIN 53 420, of from 800 to 1400 kg/m$^3$, a tear strength, measured in accordance with DIN 53 504, of from 15 to 55 N/mm$^2$, preferably from 20 to 45 N/mm$^2$, an elongation at break, measured in accordance with DIN 53 504 of from 20 to 400%, preferably 60 to 350%, a tear propagation strength, measured in accordance with DIN 53 515, of from 25 to 140 N/mm$^2$, preferably from 30 to 120 N/mm$^2$, a Shore D hardness, measured in accordance with DIN 53 505, of from 40 to 80, preferably from 45 to 75, a modulus of elasticity in bending, measured in accordance with DIN 53 457, of from 200 to 2000, and a heat distortion resistance (HDT), measured in accordance with ISO-75/B (DIN 53 461) of from 80° to 210° C., preferably from 90° to 205° C.

The compact moldings obtainable by the process according to the invention are used, in particular, in the automotive and aircraft industries, for example as fender covers, bump-protection strips, body parts, eg. drip moldings, wings, spoilers, wheel arch wideners, and for other industrial housings and rollers. The cellular moldings are suitable for shoe soles, armrests, headrests, sun visors, safety panelling in passenger compartments, and as motor cycle, tractor or cycle saddles, cushions and surface layers in composite articles.

EXAMPLE 1 a) Preparation of N,N'-polyoxypropylenedibenzylimine 6000 parts by weight of a polyoxypropylenediamine of the structure.

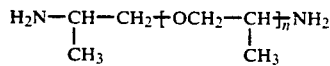

having a mean molecular weight of 2000 were conditioned at 50° C. in a 10 liter three-necked flask, equipped with stirrer, dropping funnel and distillation apparatus. 1300 parts by weight of a solution comprising 650 parts by weight of benzaldehyde and 650 parts by weight of cyclohexane were added dropwise over the course of 1 hour with vigorous stirring, and the mixture was stirred at 50° C. for a further 15 minutes.

The volatile constituents of the reaction mixture were removed at a bottom temperature of up to 100° C., first at atmospheric pressure and subsequently with continuous reduction in the pressure down to from 2 to 3 mbar. The residue obtained was 6500 parts by weight of N,N'-polyoxypropylenedibenzylimine, which was hydrogenated without further purification.

b) Preparation of N,N'-dibenzylpolyoxypropylenediamine.

6000 parts by weight of the N,N'-polyoxypropylenedibenzylimine prepared as described in Example 1a were hydrogenated in a 10 liter autoclave for 20 hours using hydrogen at 130° C. under a pressure of 200 bar in the presence of 250 parts by weight of Raney nickel which had previously been washed with methanol and cyclohexane. After the autoclave had been decompressed, the reaction mixture was filtered under pressure, and the volatile constituents were subsequently removed at 5 mbar at a maximum bottom temperature of 150° C.

N,N'-dibenzylpolyoxypropylenediamine was obtained in virtually quantitative yeilds.

EXAMPLE 2 a) Preparation of N,N',N''-polyoxypropylenetribenzylimine 6000 parts by weight of a polyoxypropylenetriamine having the structure

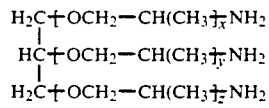

and having a mean molecular weight of 3000 were reacted by a method similar to that of Example 1a with 1300 parts by weight of a solution comprising 650 parts by weight of freshly distilled benzaldehyde and 650 parts by weight of cyclohexane.

The residue obtained comprised 6800 parts by weight of N,N',N''-polyoxypropylenetribenzylimine, which was hydrogenated without further purification.

b) Preparation of N,N',N''-tribenzylpolyoxypropylenetriamine 6800 parts by weight of the N,N',N''-polyoxypropylenetribenzylimine prepared in Example 2a were hydrogenated by a method similar to that of Example 1b.

N,N',N''-tribenzylpolyoxypropylenetriamine was obtained in virtually quantitative yield.

Preparation of elastomers containing N-benzylurea groups.

EXAMPLE 3

A component

Mixture of
- 38.75 parts by weight of N,N'-dibenzylpolyoxypropylenediamine, prepared as indicated in Examples 1a and 1b,
- 30.0 parts by weight of a mixture of 1-methyl-3,5-diethylphenylene-2,4-diamine and 1-methyl-3,5-diethylphenylene-2,6-diamine in the weight ratio 80:20, and
- 31.25 parts by weight of polyoxypropylenediamine having a mean molecular weight of 2,000 and containing 91% by weight or more primary amino groups (Jeffamine ® D2000 from Texaco)

B component

NCO-containing prepolymer having an NCO content of 20% by weight, prepared by reacting a carbodiimide-containing 4,4'-diphenylmethane diisocyanate having an NCO content of 29.5% by weight with a polyoxypropylene diol initiated using dipropylene glycol and having a hydroxyl number of 56.

Components A and B were mixed in the mixing ratio A:B=100:96.4 parts by weight in a Puromat ® 30 high-pressure metering unit from Elastogran Polyurethane GmbH, Machine Construction Business Area, and injected into a metallic mold at 90° C. with internal dimensions 400×200×4 mm. The temperature of the A component was 65° C. and that of the B component was 50° C.

The flow path of the reaction mixture, at a mold temperature of 90° C., was 221 cm, measured using a S-shaped flow channel having a diameter of 10 mm at an output of 300 g/sec at a shot time of 1 second. The initial Shore D hardness of the molded sheet after 40 seconds was 47.

The following mechanical data were measured on the molding conditioned at 160° C. for one hour:

| | | |
|---|---|---|
| Green density | DIN 53 420 [kg/m$^3$]: | 1108 |
| Tear strength | DIN 53 504 [N/mm$^2$]: | 36 |
| Elongation at break | DIN 53 504 [%]: | 176 |
| Tear propagation strength | DIN 53 515 [N/mm$^2$]: | 33 |
| Hardness | DIN 53 505 [Shore D]: | 74 |
| Modulus of elasticity | DIN 53 457 [N/mm$^2$]: | 590 |
| Heat distortion resistance (HDT) in accordance with ISO-75/B | DIN 53 461 [°C.]: | 175 |

COMPARISON EXAMPLES I TO III

The procedure was similar to that of Example 3, but the N,N'-dibenzylpolyoxypropylenediamine was replaced by the following unsubstituted or N-alkyl-substituted polyoxypropylenediamines in the following mixing ratios of components A:B.

| Comparison example | Polyoxypropylene-diamine | Mixing ratio of components A:B [parts by weight] |
|---|---|---|
| I | N,N'-Dibutylpolyoxy-propylenediamine (molecular weight about 2,100) | 100:96.2 |
| II | N,N'-Dicyclopentylpoly-oxypropylenediamine (molecular weight about 2,100) | 100:96.7 |
| III | Polyoxypropylenediamine (Jeffamine ® D2000) | 100:97.2 |

The reaction mixtures had the following flow behavior, measured at 90° C. by the above-described method.

In order to determine the throughput behavior, the Shore D hardness after 40 seconds was determined.

| Comparison example | Flow path [cm] | Shore D hardness after 40 seconds |
|---|---|---|
| I | 195 | 53 |
| II | 190 | 51 |
| III | 174 | 54 |

The following mechanical properties were measured on moldings conditioned at 160° C. for one hour

| | | Comparison example | | |
|---|---|---|---|---|
| | | I | II | III |
| Green density | DIN 53 420 [kg/m$^3$]: | 1104 | 1109 | 1106 |
| Tear strength | DIN 53 504 [N/mm$^2$]: | 34 | 34 | 36 |
| Elongation at break | DIN 53 504 [%]: | 153 | 153 | 155 |
| Tear propagation strength | DIN 53 515 [N/mm$^2$]: | 30 | 31 | 33 |
| Hardness | DIN 53 505 [Shore D]: | 71 | 71 | 74 |
| Modulus of elasticity | DIN 53 457 [N/mm$^2$]: | 615 | 653 | 652 |
| Heat distortion resistance (HDT) in accordance with ISO-75/B | DIN 53 461 [°C.]: | 170 | 169 | 180 |

We claim:

1. An N,N'-dibenzylpolyoxyalkylenediamine having a molecular weight of from 410 to 8,000 and containing a polyoxyalkylene radical selected from the group comprising polyoxyethylene, polyoxypropylene, polyoxytetramethylene, polyoxypropylene-polyoxyethylene, polyoxytetramethylene-polyoxypropylene and/or -polyoxyethylene radicals.

2. An N,N',N''-tribenzylpolyoxyalkylenetriamine having a molecular weight of from 662 to 8,000 and containing a polyoxyalkylene radical selected from the group comprising polyoxyethylene, polyoxypropylene, polyoxytetramethylene, polyoxypropylene-polyoxyethylene, polyoxytetramethylene-polyoxypropylene and/or -polyoxyethylene radicals.

3. A polyoxyalkylene-polyamine mixture which contains from 10 to 90% of benzylamino groups from N,N'-dibenzylpolyoxyalkylenediamines, N,N',N''-tribenzylpolyoxyalkylenetriamines or mixtures of these N-benzylpolyoxyalkylene-polyamines having molecular weights of from 410 to 8,000, and from 10 to 90% of primary amino groups from one or more polyoxyalkylene-polyamines containing 2 and/or 3 primary amino groups and having a molecular weight of from 1,100 to 8,000, the polyoxyalkylene radicals being selected from the group comprising polyoxypropylenepolyoxyethylene, polyoxytetramethylene and preferably polyoxypropylene radicals, and the percentages being based on the sum of N-benzylamino groups and primary amino groups.

* * * * *